United States Patent [19]

Harris

[11] Patent Number: 4,966,189
[45] Date of Patent: Oct. 30, 1990

[54] TANK VALVE MOUNTING ASSEMBLY

[75] Inventor: Robert S. Harris, Connersville, Ind.

[73] Assignee: Stant Inc., Connersville, Ind.

[21] Appl. No.: 426,320

[22] Filed: Oct. 24, 1989

[51] Int. Cl.⁵ .............................................. F16K 24/02
[52] U.S. Cl. ................................... 137/587; 251/144; 285/319; 285/921
[58] Field of Search ............... 137/315, 351, 587, 588, 137/798; 251/144, 148; 285/194, 205, 319, 921

[56] References Cited

U.S. PATENT DOCUMENTS

| | | | |
|---|---|---|---|
| 3,232,644 | 2/1966 | Pfeifer et al. | 285/194 |
| 3,392,750 | 7/1968 | Sobeski | 251/144 X |
| 3,470,907 | 10/1969 | Shockey | 285/205 X |
| 3,892,169 | 7/1975 | Jarnot | 285/921 X |
| 4,128,264 | 12/1978 | Oldford | 285/319 X |
| 4,462,620 | 7/1984 | Bambeck et al. | 285/921 X |
| 4,760,858 | 8/1988 | Szlaga | 137/587 X |
| 4,762,343 | 8/1988 | Hirohata | 285/921 X |
| 4,773,474 | 9/1988 | Stay | 285/319 X |
| 4,852,761 | 8/1989 | Turner et al. | 137/588 |

Primary Examiner—John Rivell
Attorney, Agent, or Firm—Barnes & Thornburg

[57] ABSTRACT

An assembly is provided for mounting a vent valve apparatus in an aperture extending through a wall of a tank containing vapor to be vented. The vent valve apparatus includes a neck keyed to engage a flat edge of the aperture to block rotation of the vent valve apparatus about its longitudinal axis relative to the tank. The vent valve apparatus further includes at least one support arm having a tab that snaps outwardly to engage a collar attached to the underside of the tank wall and retain the vent valve apparatus in its mounted position within the aperture.

17 Claims, 1 Drawing Sheet

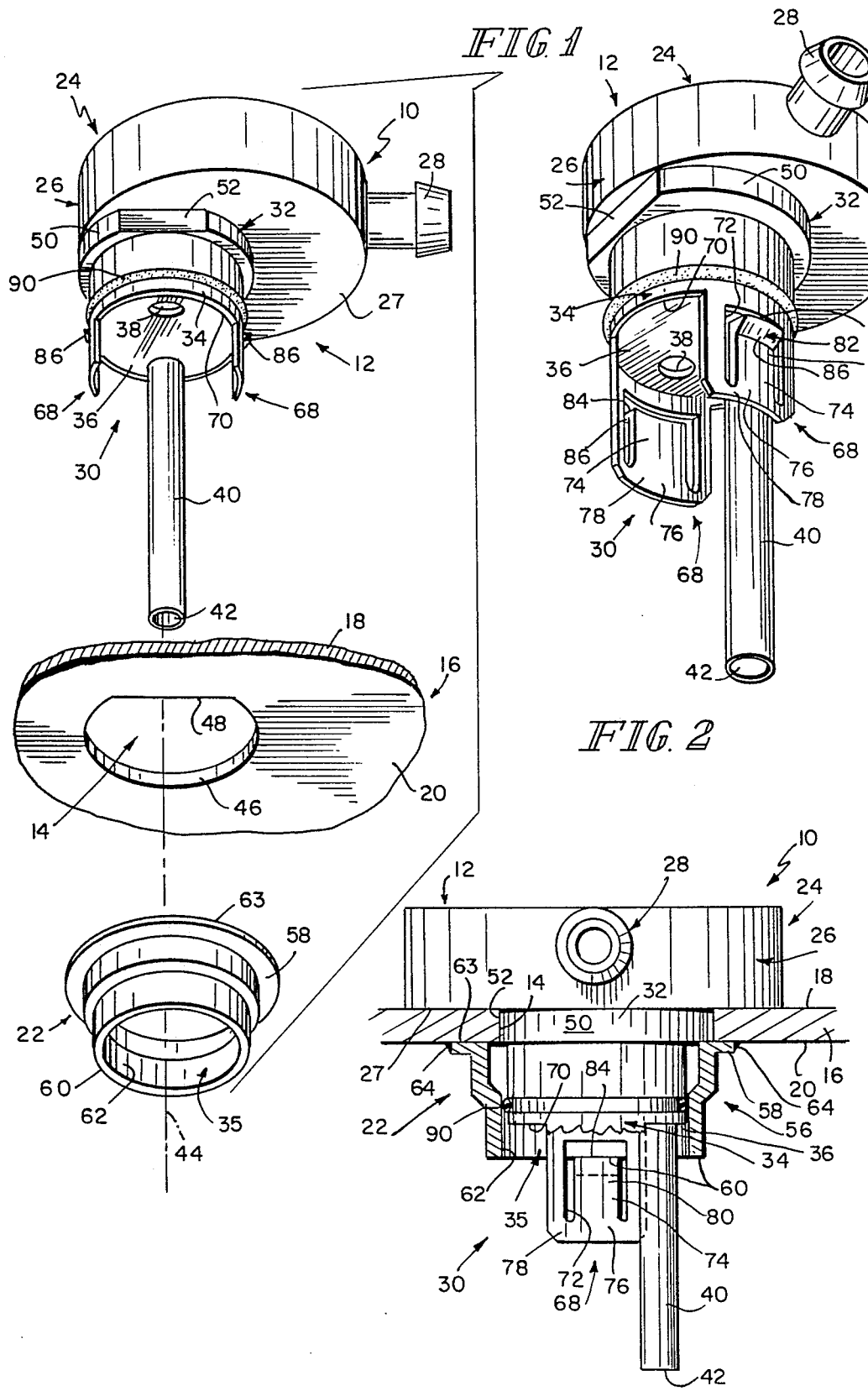

TANK VALVE MOUNTING ASSEMBLY

Background and Summary of the Invention

The present invention relates to an assembly for mounting a valve in a wall of a tank or the like. More particularly, the present invention relates to a vent valve housing that is mounted in a venting outlet aperture provided in a fuel tank.

It is known to mount vent valve apparatus in a venting outlet formed in the top wall of a fuel tank as shown in U.S. Pat. No. 4,790,349 to Harris. The vent valve apparatus disclosed in the '349 patent operates to control discharge of fuel vapor from the fuel tank during refueling to prevent a fuel pump operator from overfilling the fuel tank. The '349 patent discloses a gasket in the venting outlet to establish a fuel vapor seal between the fuel tank wall and the vent valve apparatus and support the vent valve apparatus in the venting outlet.

One object of the present invention is to provide a tank valve mounting assembly that is keyed to the tank valve so that the tank valve can be mounted in only one way in the venting outlet and is unable to rotate in the venting outlet relative to the tank.

Another object of the present invention is to provide valve apparatus that into engagement with a rigid fixture attached to the fuel tank to hold the valve apparatus in place in a venting outlet formed in the tank without relying on a sealing gasket to support the valve apparatus in its mounted position.

Yet another object of the invention is to provide a mounting assembly that is usable to clamp an apparatus in a mounted position in an aperture formed in a wall to provide an effective vapor seal in the aperture between the wall and the apparatus.

According to the invention, an assembly is provided for mounting a vent valve apparatus in an aperture extending through a wall of a tank containing vapor to be vented. The assembly includes a collar depending from an inner side of the wall to extend into the tank. The collar is formed to include a central passage communicating with the aperture formed in the wall. Means is provided on the vent valve apparatus for engaging an outer side of the wall upon insertion of the vent valve apparatus into the aperture to establish a mounting position of the vent valve apparatus relative to the wall. Means is also provided on the vent valve apparatus for retaining the vent valve apparatus in its mounted position. The retaining means is positioned in the tank to engage the collar so that the wall and collar are clamped between the engaging means and the retaining means.

In preferred embodiments, the vent valve apparatus includes a head portion positioned outside of the tank. The head portion is provided with a downwardly facing surface engaging the exterior surface of the tank wall in the region surrounding the tank venting aperture to block movement of the head portion into the aperture and establish the mounting position of the vent valve apparatus. The head portion includes a vapor discharge outlet positioned outside the tank to discharge vapor conducted through the vent valve apparatus from the interior of the tank.

The vent valve apparatus also includes neck and body portions positioned inside the tank. The neck portion has a flat surface keyed to engage a flat edge defining a portion of the aperture boundary in the tank wall so that rotation of the vent valve apparatus in the aperture relative to the tank itself is blocked. The body portion has at least one flexible support arm provided with a tab arranged to engage the collar upon movement of the vent valve apparatus to its mounted position in the aperture formed in the tank wall and a central passage formed in the collar.

In practice, each support arm is biased to flex inwardly toward the longitudinal axis of the collar during engagement of its collar-engaging tab and the interior surface in the collar defining the central passage as the body portion is punched through the aperture and central passage. Once each tab exits the central passage through a bottom opening in the collar, it is moved in a radially outward direction relative to the longitudinal axis of the collar by "snap-action" of the biased support arm to cause an axially upwardly facing surface of the tab to engage an annular, axially downwardly facing surface of the collar surrounding the bottom opening of the collar. This engagement is sufficient to retain the vent valve apparatus in its mounted position in the aperture formed in the tank wall.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an exploded perspective view of a tank valve mounting assembly in accordance with the present invention showing a vent valve apparatus in a position about to be deposited into an aperture formed in a tank wall and a mounting collar in a position ready to be attached to the tank wall to support the vent valve apparatus;

FIG. 2 is a perspective view of the vent valve apparatus illustrated in FIG. 1 showing a pair of flexible support arms and a tab at the distal tip of each support arm for engaging a bottom face of the collar; and FIG. 3 is a sectional view of the invention shown in FIG. 1 in its mounting position in the aperture formed in the tank wall with a lower portion of the vent valve apparatus broken away to show engagement of a collar-engaging tab on the rear support arm with the bottom face of the collar.

Detailed Description of the Drawings

The mounting assembly of the present invention provides means suitable for mounting a variety of apparatus in an aperture formed in a wall. In the preferred embodiment, this mounting assembly is used to mount a venting valve apparatus of the type used to control the volume of fuel that may be introduced into a fuel tank during refueling of a vehicle. In particular, the mounting assembly is used to mount such a vent valve apparatus in an aperture formed in the top wall of a fuel tank. Nevertheless, it will be appreciated by those skilled in the art that the mounting assembly in accordance with this invention is not limited to valve apparatus or to apparatus mounted in walls in fuel tanks. It is expected that this mounting assembly has utility in mounting various types of apparatus in a variety of apertures formed in walls or other structures.

Referring to FIG. 1, a mounting assembly 10 includes a vent valve apparatus 12 which can be inserted into a venting outlet aperture 14 formed in the top wall 16 of a fuel tank (not shown) and a collar 22 which is attachable to an interior surface 20 of the fuel tank wall 16. The fuel tank wall 16 also includes an exterior surface 18 located outside of the fuel tank as seen in FIG. 3. Aperture 14 has a top opening in the exterior surface 18 and a bottom opening in the interior surface 20.

The vent valve apparatus 12 includes an outer portion 24 that remains outside of the fuel tank and an inner portion 30 that extends into the fuel tank to communicate with fuel vapor and liquid fuel contained in the tank. The final mounted position of outer portion 24 and inner portion 30 is best seen in FIG. 3. The head 26 includes a downwardly facing surface 27 that abuts the exterior surface 18 of top wall 16 in the region immediately surrounding the top opening in the venting outlet aperture 14. In the preferred embodiment, wall 16 is the top wall of a fuel tank so that head 26 will be supported by gravity in a position shown in FIG. 3 in which the downwardly facing surface 27 engages the upwardly facing exterior surface 18 to establish a mounting position of the vent valve apparatus 12. Head 26 further includes a radially outwardly projecting vapor discharge outlet 28.

When the vent valve apparatus 12 is supported on the top wall 16 of the fuel tank in the position shown in FIG. 3, the inner portion 30 extends into the interior region of the fuel tank through venting outlet aperture 14. Inner portion 30 includes a neck 32 disposed in venting outlet aperture 14 and a body 34 depending from the neck 32 and lying in a central passage 35 provided in the collar 22. As shown best in FIG. 2, the diameter of the neck 32 is less than the diameter of head 26 yet greater than the diameter of body 34.

Body 34 includes a downwardly facing bottom wall 36 which is illustratively formed to include a vapor discharge inlet 38 as shown best in FIGS. 1 and 2. An extension tube 40 exits body 34 through another aperture formed in bottom wall 36 and extends in an axially downward direction toward the bottom of the fuel tank.

Reference is hereby made to U.S. Pat. No. 4,790,349 to Harris for a description of a suitable internal structure for vent valve apparatus 12. The Harris '349 patent is hereby incorporated by reference and describes an assembly for controlling flow of fuel vapor in the fuel tank to the atmosphere along a path configured to interconnect vapor discharge inlet 38 and vapor discharge outlet 28. Briefly, referring to FIG. 2, extension tube 40 depends from body 34 and is situated so that its inlet aperture 42 is able to communicate with liquid fuel (not shown) contained in the fuel tank. As the tank is filled during refueling, liquid fuel admitted into extension tube 40 builds a progressively larger and larger pressure head in a venting control chamber (not shown) located in head 26 to force a valve member (not shown) in head 26 to move to a closed position blocking flow of fuel vapor from the vapor discharge inlet 38 to the vapor discharge outlet 28.

Rotation of vent valve apparatus 12 about its longitudinal axis 44 relative to fuel tank wall 16 is blocked by keying neck 32 to remain in a fixed position within venting outlet aperture 14 formed in fuel tank wall 16. Referring to FIG. 1, fuel tank wall 16 includes an inner edge defining the venting outlet aperture 14 and including a curved edge 46 and a flat edge 48. Neck 32 includes a curved side wall 50 mating with curved edge 46 and a flat side wall 52 mating with flat edge 48. Engagement of flat side wall 52 with flat edge 48 serves to block rotation of neck 32 and the rest of vent valve apparatus 12 about longitudinal axis 44. Advantageously, this feature causes vent valve apparatus 12 to be keyed so that it can be mounted in only one angular position in the venting outlet aperture 14.

Collar 22 includes an elongated sleeve 56 coaxially aligned with longitudinal axis 44 and an annular flange 58 appended to an axially upper end of elongated sleeve 56. An annular bottom face 60 is provided on the terminal end of elongated sleeve 56. Sleeve 56 also includes a cylindrical interior surface 62 defining the central passage 35 which extends through the center of elongated sleeve 56.

Annular flange 58 includes an annular flat upwardly facing wall 63 abutting interior surface 20 of fuel tank wall 16 as shown in FIG. 3. A weld 64 can extend around the periphery of annular flange 58 as shown in FIG. 3 to connect collar 22 to the fuel tank wall 16 and establish a vapor and liquid seal therebetween. It will be appreciated by those skilled in the art that this sealed end connection could be accomplished in a number of different ways as long as fuel vapor or liquid fuel is unable to escape the interior of the fuel tank through the joint between collar 22 and fuel tank wall 16.

A pair of shoulder sections 68 extend downwardly in spaced-apart parallel relation from a lower edge 70 of body portion 34 as shown best in FIGS. 1 and 2. A concave portion of shoulder section 68 faces toward longitudinal axis 44 and a convex portion of shoulder section 68 faces away from longitudinal axis 44. Since each of the shoulder sections 68 are substantially identical, only one of the shoulder sections 68 will be described in the following paragraphs.

The shoulder section 68 is formed to include a window 72 extending through the shoulder section to have an opening in both the concave and convex side walls of shoulder section 68. A flexible support arm 74 is positioned in each window 72 and includes a base 76 integrally appended to a distal portion 78 of the shoulder section 68. The support arm 74 extends in an axially upward direction from distal portion 78 and terminates in a tip 80. A collar-engaging tab 82 is integrally appended to tip 80 as shown best in FIG. 2. The support arm 74 is flexible and able to bend toward and away from longitudinal axis 44 about its base 76 to move the collar-engaging tab 82 appended to its tip 80 in radially inward and outward directions.

Collar-engaging tab 82 includes an upwardly facing top face 84 and an angled, radially outwardly facing cam face 86 as shown best in FIG. 2. The top face 84 is positioned so that it will engage the annular bottom face 60 of collar 22 when the vent valve apparatus 12 is moved to its mounting position in collar 22 as shown in FIG. 3. This engagement of collar-engaging tab and collar 22 acts to block removal of vent valve apparatus 12 from its position inside the fuel tank through venting outlet aperture 14.

In assembly, vent valve apparatus is deposited into the fuel tank through the venting outlet aperture 14. As it is moved through aperture 14 to its mounting position, the cam face 86 of each collar-engaging tab 82 engages the interior surface 62 of collar 22 to bias each support arm 74 in a radially inward direction toward longitudinal axis 74. Essentially, each support arm bends inwardly about its base 76. This happens because the radially outermost edge of each collar-engaging tab, which is the portion which engages interior surface 62, is situated normally to lie outside of the central passage 35 through collar 22. Accordingly, engagement of collar-engaging tab 82 and interior surface 62 causes each support arm 74 to be biased inwardly toward longitudinal axis 44.

Once the vent valve apparatus 12 is moved to its mounting position shown in FIG. 3, the collar-engaging tabs 82 provided at the tip 80 of each support arm 74 will have exited from central passage 35 formed in collar 22. At this point, each collar-engaging tab will move in a radially outward direction away from longitudinal axis 44 as the biased support arm 74 snaps in a radially outward direction to assume its normal upright orientation. Once this snapping action has occurred, the top face 84 of collar-engaging tab 82 is positioned underneath collar 22 to engage the annular bottom face 60 of collar sleeve 56.

The vent valve apparatus 12 is held in place by clamping action provided by engagement of downwardly facing surface 27 on head 26 with exterior surface 18 of fuel tank wall 16 and engagement of collar-engaging tab 82 and the annular bottom face 60 of collar 22. A flexible O-ring made of sealing material is provided around an exterior side wall of body portion 34 as shown in FIG. 2. The O-ring seal 90 acts to establish a fuel vapor and liquid fuel seal between body portion 34 and the interior surface 62 of collar sleeve 56 to prevent any liquid fuel or fuel vapor from escaping to the atmosphere through venting outlet aperture 14 without being forced to pass through vent valve apparatus 12. Advantageously, O-ring seal 90 only establishes a sealing connection between collar 22 and vent valve apparatus 12 and is not relied upon to support vent valve apparatus 12 in is mounted position in venting outlet aperture 14.

Although the invention has been described in detail with reference to certain preferred embodiments, variations in modifications exist within the scope and spirit of the invention as described and defined in the following claims.

What is claimed is:

1. An assembly for mounting a vent valve apparatus in an aperture extending through a wall of a tank containing vapor to be vented, the assembly comprising
    a collar depending from an inner side of the wall to extend into the tank, the collar being formed to include a central passage communicating with the aperture formed in the wall,
    means on the vent valve apparatus for engaging an outer side of the wall upon insertion of the vent valve apparatus into the aperture to establish a mounting position of the vent valve apparatus relative to the wall,
    means on the vent valve apparatus for retaining the vent valve apparatus in its mounted position, the retaining means being positioned in the tank to engage the collar so that the wall and collar are clamped between the engaging means and the retaining means, and
    wherein the collar includes an elongated sleeve having an interior surface defining the central passage and a flange appended to one end of the elongated sleeve, and the flange is connected to the inner side of the wall to establish a vapor seal interconnecting the wall and the collar so that vapor in the tank must pass through the central passage in the collar before it exits the tank through the aperture passage.

2. The assembly of claim 1, wherein the vent valve apparatus further includes means in the central passage for sealingly engaging the interior surface of the elongated sleeve to block vapor flow through a space between the collar and the vent valve apparatus.

3. The assembly of claim 1, wherein the elongated sleeve further includes an opposite end situated to lie in spaced relation to the inner side of the wall and a bottom face at the opposite end, and the retaining means engages the bottom face.

4. The assembly of claim 3, wherein the vent valve assembly includes a body sized to fit in the central passage provided in the sleeve upon movement of the vent valve apparatus to its mounting position, and the retaining means includes a collar-engaging tab and a flexible support arm interconnecting the collar-engaging tab and the body and providing means for yieldably urging the collar-engaging tab in a direction away from the longitudinal axis of the central passage from a radially inner position engaging the inner surface of the elongated sleeve to a radially outer position lying outside of the central passage and engaging the bottom face of the elongated sleeve upon movement of the vent valve apparatus to its mounting position.

5. The assembly of claim 1, wherein the retaining means includes a collar-engaging tab and means for yieldably urging the collar-engaging tab in a radially outward direction relative to the longitudinal axis of the central passage to move the collar-engaging tab from a retracted position engaging the interior surface of the elongated sleeve to a projected position lying outside the central passage and engaging the collar upon movement of the vent valve assembly to its mounting position.

6. The assembly of claim 5, wherein the vent valve apparatus includes a body disposed in the central passage, an axially extending shoulder section depending from the body and being formed to include an open window therein, and a flexible support arm disposed in the open window for movement in a radial direction relative to the axially extending shoulder section, the support arm having a base integrally appended to a portion of the shoulder section defining a bottom edge of the window and a tip extending in a direction toward the inner side of the tank wall, and the collar-engaging tab is integrally appended to the tip of the support arm.

7. The assembly of claim 1, wherein the wall of the tank includes an inner edge defining the aperture, the inner edge includes a flat portion and the vent valve apparatus includes means for engaging the flat portion to block rotation of the vent valve apparatus about its longitudinal axis relative to the wall of the tank.

8. The assembly of claim 7, wherein he vent valve apparatus includes a head including the engaging means, a body including the retaining means, and a neck interconnecting the head and body, and the neck includes the engaging means.

9. The assembly of claim 8, wherein the engaging means includes a flat surface on the neck mating with the flat portion on the inner edge of the wall.

10. An assembly for mounting a vent valve apparatus in an aperture extending through a wall of a tank containing vapor to be vented, the assembly comprising
    a collar formed to include a central passage extending therethrough, means for sealingly attaching the collar to an inner side of the wall to connect the aperture and central passage in sealed fluid communication, an outer portion of the vent valve apparatus situated outside of the tank, the outer portion including a surface engaging an outer side of the wall to establish a mounting position of the vent valve apparatus relative to the wall, an inner portion of the vent valve apparatus extending into the tank through the aperture and central passage, the inner portion including means for engaging the collar to block removal of the inner portion from the fuel tank through the aperture and central passage, and means in the central passage for establishing a seal between the collar and the inner portion so that vapor must pass through the vent valve apparatus to exit the tank through the aperture.

11. The assembly of claim 10, wherein the wall of the tank includes an inner edge defining the aperture, the inner edge includes a flat portion, and the inner portion of the vent valve apparatus includes means for engaging the flat portion to block rotation of the vent valve apparatus about its longitudinal axis relative to the wall of the tank.

12. The assembly of claim 10, wherein the inner portion includes a body disposed in the central passage of the collar and at least one shoulder section depending from the body to extend in an axial direction out of the central passage to a point below a distal end of the collar, and the engaging means is appended to the at least shoulder section to lie outside of the central passage.

13. The assembly of claim 12, wherein the at least one shoulder section is formed to include an open window therein and the engaging means includes a flexible support arm disposed in the open window of each shoulder section, each support arm including a base appended to a portion of the shoulder section defining a bottom edge of the window and a tip disposed in the window and movable relative to the shoulder section upon bending movement of the flexible support arm about its base, and a clamping tab appended to the tip and configured to engage the collar so that the wall and collar are clamped between the clamping surface on the outer portion and the clamping tab on the inner portion to retain the vent valve apparatus in its mounting position.

14. An assembly for mounting a vent valve apparatus in an aperture extending through a wall of a tank containing vapor to be vented, the assembly comprising a collar formed to include a central passage extending therethrough, means for sealingly fixing the collar to an inner side of the wall to connect the aperture and central passage in sealed fluid communication, an outer portion of the vent valve apparatus situated outside of the tank, the outer portion including a surface engaging an outer side of the wall to establish a mounting position of the vent valve apparatus relative to the wall, and an inner portion of the vent valve apparatus extending into the tank through the aperture and central passage, the inner portion including means for engaging the collar to block removal of the inner portion from the fuel tank through the aperture and central passage.

15. The assembly of claim 14, wherein the wall of the tank includes an inner edge defining the aperture, the inner edge includes a flat portion, and the inner portion of the vent valve apparatus includes means for engaging the flat portion to block rotation of the vent valve apparatus about its longitudinal axis relative to the wall of the tank.

16. The assembly of claim 14, wherein the inner portion includes a body disposed in the central passage of the collar and at least one shoulder section depending from the body to extend in an axial direction out of the central passage to a point below a distal end of the collar, and the engaging means is appended to the at least shoulder section to lie outside of the central passage.

17. The assembly of claim 16, wherein the at least one shoulder section is formed to include an open window therein and the engaging means includes a flexible support arm disposed in the open window of each shoulder section, each support arm including a base appended to a portion of the shoulder section defining a bottom edge of the window and a tip disposed in the window and movable relative to the shoulder section upon bending movement of the flexible support arm about its base, and a clamping tab appended to the tip and configured to engage the collar so that the wall and collar are clamped between the surface on the outer portion and the clamping tab on the inner portion to retain the vent valve apparatus in its mounting position.

* * * * *